US011118042B2

(12) United States Patent
van Beek et al.

(10) Patent No.: US 11,118,042 B2
(45) Date of Patent: Sep. 14, 2021

(54) EXPANSION RESERVOIR OF POLYPROPYLENE WITH GLASS FIBERS

(71) Applicant: SABIC GLOBAL TECHNOLOGIES B.V., Bergen op Zoom (NL)

(72) Inventors: Dimphna Johanna Maria van Beek, Geleen (NL); Gerard Jan Eduard Biemond, Brunssum (NL); Ginger de la Croix, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 450 days.

(21) Appl. No.: 15/743,861

(22) PCT Filed: Jul. 19, 2016

(86) PCT No.: PCT/EP2016/067205
§ 371 (c)(1),
(2) Date: Jan. 11, 2018

(87) PCT Pub. No.: WO2017/013128
PCT Pub. Date: Jan. 26, 2017

(65) Prior Publication Data
US 2018/0208754 A1    Jul. 26, 2018

(30) Foreign Application Priority Data

Jul. 21, 2015  (EP) ..................................... 15177697

(51) Int. Cl.
| | | |
|---|---|---|
| *F01P 11/02* | (2006.01) | |
| *C08L 23/12* | (2006.01) | |
| *C08L 23/14* | (2006.01) | |
| *B29C 49/00* | (2006.01) | |
| *B29C 45/00* | (2006.01) | |
| *C08K 7/14* | (2006.01) | |
| *B29K 23/00* | (2006.01) | |
| *B29K 105/00* | (2006.01) | |
| *B29K 105/12* | (2006.01) | |
| *B29K 309/08* | (2006.01) | |
| *B29L 31/00* | (2006.01) | |

(52) U.S. Cl.
CPC .......... *C08L 23/14* (2013.01); *B29C 45/0001* (2013.01); *B29C 45/0005* (2013.01); *B29C 49/0005* (2013.01); *C08K 7/14* (2013.01); *C08L 23/12* (2013.01); *F01P 11/029* (2013.01); *B29K 2023/12* (2013.01); *B29K 2105/0002* (2013.01); *B29K 2105/0085* (2013.01); *B29K 2105/0094* (2013.01); *B29K 2105/12* (2013.01); *B29K 2309/08* (2013.01); *B29K 2995/0077* (2013.01); *B29K 2995/0083* (2013.01); *B29L 2031/712* (2013.01); *C08L 2205/025* (2013.01); *C08L 2205/03* (2013.01)

(58) Field of Classification Search
CPC .......... C08L 23/10–24; C08L 2205/025; F01P 11/029; B29K 2023/10; B29K 2023/12; B29K 2023/14; B65D 85/68
See application file for complete search history.

(56) References Cited

U.S. PATENT DOCUMENTS

| | | | | |
|---|---|---|---|---|
| 6,077,907 A | * | 6/2000 | Raetzsch ................. | C08L 51/06 525/191 |
| 2004/0220325 A1 | | 11/2004 | Kitano et al. | |
| 2006/0247381 A1 | * | 11/2006 | Mori ....................... | C08L 23/14 525/240 |
| 2007/0123615 A1 | * | 5/2007 | Mecklenburg ........... | C08K 7/14 524/88 |
| 2013/0190443 A1 | | 7/2013 | Margraf et al. | |

FOREIGN PATENT DOCUMENTS

| | | |
|---|---|---|
| CN | 102993560 A | 3/2013 |
| CN | 103980611 A | 8/2014 |
| WO | 2005040263 A1 | 5/2005 |
| WO | 2009083500 A1 | 7/2009 |

OTHER PUBLICATIONS

International Search Report for International Application No. PCT/EP2016/067205; International Filing Date: Jul. 19, 2016; dated Oct. 19, 2016; 3 Pages.
Machine Translation of CN103980611A; Date of Publication: Aug. 13, 2014; 15 Pages.
Written Opinion of the International Searching Authority for International Application No. PCT/EP2016/067205; International Filing Date: Jul. 19, 2016; dated Oct. 19, 2016; 4 Pages.
"Plastics Engineering Handbook", Editorial Committee of Plastic Engineering Handbook, Mechanical Industry Press, vol. 1. No. 1, Apr. 2000; pp. 870-871.
Chen Leyi et al.; "Performance and Application Handbook of Common Synthetic Resins" Chemical Industry Press, vol. 1, No. 1; Apr. 2002, pp. 147-148.

(Continued)

*Primary Examiner* — Lee E Sanderson
*Assistant Examiner* — Michael C Romanowski
(74) *Attorney, Agent, or Firm* — Cantor Colburn LLP

(57) ABSTRACT

The present invention relates to a container, preferably a cooling fluid expansion reservoir prepared from a thermoplastic composition comprising from 95-70 wt. % based on the weight of the thermoplastic composition of a polypropylene composition having a total amount of comonomer of at most 3 wt. % based on the weight of the polypropylene composition and comprising a random propylene copolymer having a comonomer content from 0.2 to 5 wt. % based on the weight of the random propylene copolymer and the random propylene copolymer having a melt flow index of at most 0.7 g/10 min determined in accordance with ISO 1133 (2.16 kg, 230° C.), from 5-30 wt. % based on the weight of the thermoplastic composition of reinforcing fibres, from 0-5 wt. % based on the weight of the thermoplastic composition of additives.

17 Claims, No Drawings

(56) References Cited

OTHER PUBLICATIONS

Chinese Search Report for Chinese Application No. 201680042894.8; International Filing Date: Jul. 19, 2016; 3 Pages.

Furukawa et al.; "Discrimination of Various Poly(propylene) Copolymers and Prediction of Their Ethylene Content by Near-Infrared and Raman Spectroscopy in Combination with Chemometric Methods" Journal of Applied Polymer Science, vol. 87; 2003, pp. 616-625.

Nello Pasquini; "Polypropylene Handbook"; Carl Hanser Verlag; 2nd Edition; Munich 2005; pp. 330-331 and 424-425.

* cited by examiner

EXPANSION RESERVOIR OF POLYPROPYLENE WITH GLASS FIBERS

CROSS REFERENCE TO RELATED APPLICATIONS

This application is a 371 of International Application No. PCT/EP2016/067205, filed Jul. 19, 2016, which claims priority to European Application No. 15177697.8 filed Jul. 21, 2015 which are incorporated herein by reference in their entirety.

The present invention relates to a container prepared from a thermoplastic composition, and to the use of a thermoplastic composition for the manufacture of a container. In particular, the invention relates to a container which is a cooling fluid expansion reservoir for automotive applications.

Internal combustion engines must be cooled due to the fact that the surfaces in contact with the hot gases and their lubricants in the interior of the cylinder can only withstand occurring temperatures to a certain extent without undergoing damage. Individual components, such as a spark plugs, injection nozzles, exhaust gas valves, pre-chambers and piston heads must be able to withstand particularly high temperatures such that components of this type must be made of highly heat resistant materials or be provided with an adequate heat dissipation mechanism and special cooling means.

This heat dissipation is normally supported by a cooling system in which a cooling fluid flows through cooling channels that surround at least the cylinders and the cylinder head in order to transport the generated heat at least in part into the surrounding by means of a radiator, or to use the heat to heat for example the interior of a vehicle by means of a heat exchanger.

A typical cooling fluid expansion reservoir is a closed vessel which, with regard to an engine, is only partially filled with liquid coolant, the remainder of the space above the liquid being available for volumetric expansion of the coolant due to heat. Coolant discharged from the engine flows into the reservoir above the level of liquid coolant via an inlet port and returns from the bottom of the reservoir via an outlet port to join the flow of coolant returned to the engine. Such an expansion reservoir also serves as a means of enabling gases dissolved or trapped in the liquid coolant to rise the liquid surface and escape. For this reason they are sometimes also referred to as a degas tank. Furthermore, the atmosphere above the liquid surface becomes heated by the incoming coolant thereby further helping to pressurise the cooling system and prevent cavitation in the pump used to circulate the coolant.

Polypropylene is a material commonly used in the preparation of automotive parts. It has several advantages including being abundant, low-cost, having good mechanical properties and a low-density. However, in order for polypropylene to be used as a material for preparing a cooling fluid expansion reservoir some additional properties are desirable including low temperature impact strength and a high temperature creep resistance.

CN103980611 discloses an expansion tank with a polypropylene composition comprising a polypropylene homopolymer, a polypropylene random copolymer, a heat resistant polyethylene, nucleating agents, and antioxidants.

These known materials used for preparing cooling fluid expansion reservoirs however often fail at high temperatures and high pressure due to a lack of high temperature creep resistance.

Cooling liquid expansion reservoirs may also be made on the basis of polyamide, such as for example disclosed in US 2013/0190443. Polyamide-based materials in general give rise to relatively good performance yet they typically suffer from water uptake and the necessity to dry and condition before welding parts together. In addition polyamide-based materials are disadvantageous in terms of density and processability in comparison to polypropylene-based materials and moreover are less cost-effective.

WO2009/083500 discloses a plastic tank comprising a propylene 1-hexene copolymer having a xylene soluble fraction lower than 5% by weight with respect to the total weight of the copolymer and satisfying the relation $A \cdot T_m / B > 70$ wherein A is the MFR measured according to the method ISO 1133 (230° C., 5 kg) expressed in g/10 min, $T_m$ is the melting temperature measured by GPC expressed in ° C. and B is the 1-hexene content expressed in percentage by weight with respect to the total weight of the copolymer.

In view of the prior art there remains a need for improved materials for preparing cooling fluid expansion reservoirs.

Accordingly it is an object of the invention to address this existing need in the art and to provide an improved material for typical use in a cooling fluid expansion reservoir.

It is a further object of the present invention to provide a thermoplastic material having a desired combination of mechanical properties in particular at elevated temperature that is inter alia suitable for the manufacture of containers, in particular cooling fluid expansion reservoirs.

The present inventors surprisingly found that these objects, at least in part, can be met by a specifically defined reinforced polypropylene composition.

Accordingly the present invention is directed at a container prepared from a thermoplastic composition comprising from 95-70 wt. % based on the weight of the thermoplastic composition of a polypropylene composition having a total amount of comonomer of at most 3 wt. % based on the weight of the polypropylene composition and comprising a random propylene copolymer having a comonomer content of at most 5 wt. % based on the weight of the random propylene copolymer and the random propylene copolymer having a melt flow index of at most 0.7 g/10 min determined in accordance with ISO 1133 (2.16 kg, 230° C.), from 5-30 wt. % based on the weight of the thermoplastic composition of reinforcing fibres, from 0-5 wt. % based on the weight of the thermoplastic composition of additives.

The thermoplastic composition combines excellent high-temperature creep resistance with high stiffness and therefore is very suitable as a material for preparing a cooling fluid expansion reservoir.

Polypropylene Composition

The term "polypropylene composition" as used in this application is to be understood as referring to a composition consisting of one or more polypropylenes. For the avoidance of doubt it should be understood that the polypropylene composition essentially consists of said one or more polypropylenes and does not contain any other materials in an amount more than 2 weight percent. Or, said in another way, the polypropylene composition consists of at least 98 wt. %, preferably at least 99 wt. % of one or more polypropylenes.

The polypropylene composition as defined herein comprises a random propylene copolymer having a comonomer content of at most 5 wt. % based on the weight of the random propylene copolymer and the random propylene copolymer having a melt flow index of at most 0.7 g/10 min determined in accordance with ISO 1133 (2.16 kg, 230° C.). It is preferred the random copolymer has a melt flow index of at most 0.5, more preferably at most 0.4, most preferably at most 0.3 g/10 min. The melt flow index of the random copolymer may be at least 0.1 g/10 min or at least 0.2 g/10 min. A preferred range for the melt flow index would be from 0.1-0.4 g/10 min.

The polypropylene composition preferably has a melt flow index of at least 0.2 g/10 min, such as at least 0.3 or 0.4 g/10 min and at most 3 g/10 min, determined in accordance with ISO 1133 (2.16 kg, 230° C.)

For the avoidance of doubt, the comonomer in the random propylene copolymer is a monomer other than propylene. Suitable comonomers include ethylene, 1-butene, 1-pentene, 1-hexene, 1-heptene, 1-octene, 1-nonene, 1-decene and 4-methyl-1-pentene. Ethylene being preferred in view of its availability and relative ease of manufacture.

The random propylene copolymer preferably has a comonomer content of from 0.2-5 wt. % based on the weight of the random propylene copolymer such as from 0.5-4.5 wt. % or 0.7-4.0 wt. % or 1.0-3.0 wt. % or from 1.0 to 3.5 wt %.

The amount of polypropylene composition is preferably from 75-92 wt. %, more preferably from 80-90 wt. % based on the weight of the thermoplastic composition.

The polypropylene composition may further comprise a propylene homopolymer, preferably a propylene homopolymer having a melt flow index of at most 5 g/10 min determined in accordance with ISO 1133 (2.16 kg, 230° C.).

In that respect the present inventors have observed that it is not required that the polypropylene composition fully consists of the random propylene copolymer but that also a mixture of a random propylene copolymer as defined herein with a propylene homopolymer can result in a container having the desired set of properties.

The amount of random propylene copolymer in the polypropylene composition is preferably from 30-70 wt. % based on the weight of the polypropylene composition. Accordingly, the amount of propylene homopolymer may be from 70-30 wt. % based on the weight of the polypropylene composition. In that respect the present inventors have observed that good quality material for the intended purpose can be obtained as long as the comonomer content is at most 3 wt. % based on the weight of the polypropylene composition.

Therefore, the invention also relates to the container of the invention, wherein the polypropylene composition comprises a random propylene copolymer in an amount from 30 to 70 wt % and a propylene homopolymer in an amount from 70 to 30 wt %.

An advantage of adding a propylene homopolymer to the polypropylene composition is that the homopolymer contributes to an increased stiffness and heat deflection temperature (HDT) of the thermoplastic composition. Furthermore the presence of a propylene homopolymer in the polypropylene composition will lower the comonomer content of the polypropylene composition.

It is preferred that in the polypropylene composition does not contain polypropylenes other than a random propylene copolymer and a propylene homopolymer. For example the polypropylene composition does not contain a heterophasic propylene copolymer.

The propylene homopolymer preferably has a melt flow index of at most 12 g/10 min (ISO 1133, 2.16 kg, 230° C.), such as at most 5 g/10 min. For example the melt flow index of the propylene homopolymer may be from 0.2-10 g/10 min or 0.3-5.0 g/10 min, such as from 0.4-3.0 g/10 min.

The propylene homopolymer suitably has a melting temperature, $T_m$, in the range of 150-175° C., preferably in the range of 155-170° C., preferably in the range of 158-168° C. The propylene homopolymer is preferably an isotactic propylene homopolymer. Furthermore, the propylene homopolymer can have a xylene cold soluble content of 5% or less by total weight of the propylene homopolymer, preferably 0.1-3.5%, more preferably 0.5-2.5%.

The xylene cold soluble content of the polypropylene composition is preferably at most 20 wt. % based on the weight of the polypropylene composition. More preferably the xylene cold soluble content is at most 15 or at most 12 wt. %. A practical lower limit for the xylene cold soluble content is 1 wt. %.

Polypropylene: Manufacture

The polypropylenes of the polypropylene composition may be manufactured with processes known to the skilled person. For example, The propylene polymer may be polymerised in a gas phase, a slurry or a bulk polymerisation process, operating in one or more than one reactor. One or more olefin monomers can be introduced in a polymerisation reactor to react with the catalyst composition and to form an olefin-based polymer (or a fluidised bed of polymer particles).

Such a process can be carried out using any suitable catalyst for the preparation of propylene monomers. Preferably, the process is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Preferred external donors are the known silane-based donors, such as dicyclopentyl dimethoxy silane or cyclohexyl methyldimethoxy silane.

In the case of polymerisation in a slurry (liquid phase), a dispersing agent is present. Suitable dispersing agents include for example propane, n-butane, isobutane, n-pentane, isopentane, hexane (e.g. iso-hexane or n-hexane), heptane (e.g. iso-hexane or n-hexane), octane, cyclohexane, benzene, toluene, xylene, liquid propylene and/or mixtures thereof. The polymerisation conditions such as the polymerisation temperature and time, monomer pressure, avoidance of contamination of catalyst, choice of polymerisation medium in slurry processes, the use of further ingredients (like hydrogen) to control polymer molar mass, and other conditions are well known to persons of skill in the art. The polymerisation temperature may vary within wide limits and is, for example for propylene polymerisation 0-120° C., preferably 40-100° C. The pressure during (propylene) (co) polymerisation is for instance 0.1-6 MPa, preferably 1-4 MPa.

The molar mass of the polyolefin obtained during the polymerisation can be controlled by adding hydrogen or any other agent known to be suitable for the purpose during the polymerisation. The polymerisation can be carried out in a continuous mode or batch-wise. Slurry, bulk, and gas phase polymerisation processes, multistage processes of each of these types of polymerisation processes, or combinations of the different types of polymerisation processes in a multistage process are contemplated herein. Preferably, the polymerisation process is a single stage gas phase process or a multistage, for instance a two-stage gas phase process, e.g.

wherein in each stage a gas phase process is used or including a separate (small) pre-polymerisation reactor.

Examples of gas-phase polymerisation processes include both stirred bed reactors and fluidised bed reactor systems. Such processes are well known in the art. Typical gas phase olefin polymerisation reactor systems comprise a reactor vessel to which an olefin monomer(s) and a catalyst system can be added and which contain an agitated bed of growing polymer particles. Preferably, the polymerisation process is a single stage gas phase process or a multistage, for instance a two-stage gas phase process wherein in each stage a gas phase process is used.

The term "gas phase polymerisation" as used in this application is meant to refer to the way of an ascending fluidising medium, the fluidising medium containing one or more monomers, in the presence of a catalyst through a fluidised bed of polymer particles maintained in a fluidised state by the fluidising medium optionally assisted by mechanical agitation. Examples of gas phase polymerisation are fluid bed, horizontal stirred bed and vertical stirred bed. The terms "fluid-bed", "fluidised", and "fluidising" as used in this application are meant to refer to a gas-solid contacting process in which a bed of finely divided polymer particles is elevated and agitated by a rising stream of gas optionally assisted by mechanical stirring. In a "stirred bed" upwards gas velocity is lower than the fluidisation threshold.

A typical gas phase polymerisation reactor (or gas phase reactor) include a vessel (i.e., the reactor), the fluidised bed, a product discharge system and may include a mechanical stirrer, a distribution plate, inlet and outlet piping, a compressor, a cycle gas cooler or heat exchanger. The vessel may include a reaction zone and may include a velocity reduction zone, which is located above the reaction zone (viz. bed). The fluidising medium may include propylene gas and at least one other gas such as an olefin and/or a carrier gas such as hydrogen or nitrogen. The contacting can occur by way of feeding the catalyst composition into the polymerisation reactor and introducing the olefin into the polymerisation reactor. In an embodiment, the process includes contacting the olefin with a co-catalyst. The co-catalyst can be mixed with the procatalyst (pre-mix) prior to the introduction of the procatalyst into the polymerisation reactor. The co-catalyst may be also added to the polymerisation reactor independently of the procatalyst. The independent introduction of the co-catalyst into the polymerisation reactor can occur (substantially) simultaneously with the procatalyst feed. An external donor may also be present during the polymerisation process.

The properties of the propylene polymer produced with the above described process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

Reinforcing Fibres

Suitable reinforcing fibres are any one or more selected from the group of glass fibres, metal fibres, mineral fibres, ceramic fibres, and carbon fibres. In a preferred embodiment glass fibres are used.

The reinforcing fibres, in particular glass fibres, have a length of from 1-10 mm and a diameter of from 5-30 µm. The skilled person will understand that in practice the fibre length and diameter will be an average value. Accordingly the average length of the glass fibres is from 1-10 mm and the average diameter is from 5-30 µm. Particularly preferred glass fibres have an (average) length of from 2-6 mm and an (average) diameter of from 7-25 µm or 7-19 µm.

The glass fibres can be cut glass fibres, also known as short glass fibres or chopped glass fibres. The glass fibres and the polypropylene composition are typically mixed, i.e. compounded, in a melt mixing device, such as an extruder, during which the glass fibres will become dispersed in the molten polypropylene composition. Before compounding, the glass fibres can have an average fibre length of 1-10 mm, preferably 2-8 mm, more preferably 3-7 mm. The distribution of fibre lengths is preferably such that at least 95% of the glass fibres in the composition have a fibre length in the range of 1-10 mm, such as in the range of 2-8 mm, or 3-7 mm. More preferably, at least 98% of the glass fibres in the composition have a fibre length in the range of 1-10 mm, such as in the range of 2-8 mm, or 3-7 mm. Before compounding, the fibres may have an average fibre diameter of 5-30 µm, such as 7-25 µm, preferably 7-19 µm. Very thick fibres may result in a decrease of mechanical properties. The distribution of fibre diameters is preferably such that at least 95% of the glass fibres in the composition have a fibre diameter in the range of 5-30 µm, such as in the range of 7-25 µm, preferably 7-19 µm. More preferably, at least 98% of the fibres have a fibre diameter in the range of 5-30 µm, such as in the range of 10-25 µm, preferably 7-19 µm.

The aspect ratio of the fibres, before compounding, can be in the range of 200-2000, preferably in the range of 200-1000, such as in the range of 250-750. The aspect ratio refers to the ratio between the average fibre length and the average fibre diameter.

Generally, the length of glass fibres in a polymer composition decreases during a melt processing step like compounding or injection moulding. The average length of the glass fibres in the container of the invention, i.e. after compounding and/or injection moulding or blow moulding, is therefore typically shorter. Preferably, the average fibre length in a moulded article (after compounding) can be from 0.05-0.9 mm, such as from 0.1-0.6 mm or 0.1-0.4 mm. The distribution of fibre lengths is then preferably such that at least 95% of the glass fibres in the composition have a fibre length in the range of 0.05-0.9 mm, such as in the range of 0.1-0.6 mm, or 0.1-0.4 mm. More preferably, at least 98% of the glass fibres in the composition have a fibre length in the range of 0.05-0.9 mm, such as in the range of 0.1-0.6 mm, or 0.1-0.4 mm.

The average glass fibre diameter does not substantially change upon compounding or downstream conversion processes.

Suitably, the glass fibres can be coated in order to improve the interaction with the polypropylene. Such coated glass fibres are also known in the art as sized glass fibres. Such coatings typically include amino silane or silane coatings. Amino silane and silane coated glass fibres are commercially available. Some examples include ECS03-480H (from NEG), ECS03T-497 (from NEG), ECS03T-480 (from NEG), HP3270 (from PPG Industries), HP3299 (from PPG Industries), ECS 305H (from CPIC), ECS 305K (from CPIC), DS2100 13P (from Binani 3B fibreglass), DS2200 10P (from Binani 3B fibreglass), and DS2200 13P (from Binani 3B fibreglass), ECS 508H (from Jushi Group Co.), HP 3299 (from PPG Fibre Glass), and JM CS EC 13636.

Additives

The thermoplastic composition may contain from 0-5 wt. % of additives such as anti-oxidants, pigments, dyes, mold-release agents, nucleating agents, light stabilisers such as hindered amine light stabilisers, UV stabilisers, heat stabilisers, acid scavengers, antistatic agents, lubricants and the like. Obviously the additives may be a mixture of at least two of the foregoing additives.

Preferred stabilisers include heat stabilisers and UV stabilisers, such as copper(I)halides, preferably chlorides, bromides or iodides in conjunction with halides of alkali metals, preferably sodium halides, potassium halides and/or lithium halides. Other preferred stabilisers include sterically hindered phenols, hydroquinones, phosphites, aromatic secondary amines, such as diphenylamines, substituted resorcinols, salicylates, benzotriazoles or benzophenones, and mixtures thereof. Preferred pigments include titanium dioxide, ultramarine blue, iron oxide, carbon black, phthalocyanines, quinacridones, perylenes, nigrosine and anthraquinones. Preferred nucleating agents include sodium phenylphosphinate, calcium phenylphosphinate, aluminium oxide, silicon dioxide, and talc powder. Preferred lubricants and demoulding agents include ester waxes, pentaerythritol tetrastearate (PETS), long-chain fatty acids (preferably stearic acid or behenic acid) and esters or salts thereof (preferably calcium stearate or zinc stearate), and also amide derivatives (preferably ethylenebisstearamide or montan waxes), straight-chain, saturated carboxylic acids having chain lengths of 28-32 carbon atoms, and also low molecular weight polyethylene waxes or low molecular weight polypropylene waxes.

The additives may be present in an amount of up to 5 wt. %, such as from 0.1-4 wt. % or 0.3-3 wt. %.

For the avoidance of doubt its is noted that these additives are combined separately with the polypropylene composition. However, the polypropylene composition may already contain certain additives, in particular anti-oxidants as is known in the art per se.

Apart from the propylene polymer and the fibres, the polypropylene composition can further comprise an adhesion promoter. The adhesion promoter is an additive. An adhesion promoter may be applied to more easily and more uniformly disperse the fibres in the polymer matrix and to promote the adhesion between the fibres and the polypropylene composition. The adhesion promoter preferably comprises a modified (functionalized) polymer and optionally a low molecular weight compound having reactive polar groups. Modified α-olefin polymers, in particular propylene homopolymers and copolymers, like copolymers of ethylene and propylene with each other or with other α-olefins, are most preferred as they are highly compatible with the polymers in the composition of the invention. Modified polyethylene can be used as well. In terms of structure, the modified polymers are preferably selected from graft or block copolymers. Preference is further given to modified polymers containing groups deriving from polar compounds, in particular one or more selected from the group consisting of acid anhydrides, carboxylic acids, carboxylic acid derivatives, primary and secondary amines, hydroxyl compounds, oxazoline and epoxides, and also ionic compounds. Specific examples of such polar compounds are unsaturated cyclic anhydrides and their aliphatic diesters, and the diacid derivatives thereof. In particular, one can use maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid and mixtures thereof.

A preferred adhesion promoter is a maleic anhydride functionalized polypropylene, such as a propylene polymer grafted with maleic anhydride. A commercially available example for a suitable adhesion promoter is Exxelor® PO1020 obtainable from ExxonMobil Chemical.

The adhesion promoter may have a melt flow index of from 1.0 to 500 g/10 min. The amount of adhesion promoter depends on the amount of glass fibre and preferably ranges from 0.03-0.20 times the amount of glass fibre in the thermoplastic composition. Thus, when 10% by total weight of the polypropylene composition of glass fibres are used, the adhesive promoter will be preferably used in an amount of 0.3-2.0% by total weight of the thermoplastic composition. When 15% by total weight of the thermoplastic composition of glass fibres are used, the adhesive promoter will be preferably used in an amount of 0.45-3.0% by total weight of the thermoplastic composition.

Thermoplastic Composition

The polypropylene composition preferably has an overall melt flow index of 0.6 g/10 min or less as measured according to ISO 1133 using a 2.16 kg weight and at a temperature of 230° C. More preferably, the overall melt flow index of the propylene composition is 0.4 g/10 min or less, even more preferably 0.3 g/10 min or less, such as in the range of 0.15-0.25 g/10 min.

The tensile modulus as measured according to ISO 527-1A at 23° C. of the polypropylene composition is preferably at least be 2000 MPa. Preferably, the tensile modulus of the polypropylene composition is 2300 MPa or more, even more preferably 2400 MPa or more. The upper limit of the tensile modulus can be as high as 9000 MPa, such as 8800 MPa.

The stress at yield as measured according to ISO 527 at 23° C. of the polypropylene composition is preferably at least 35 MPa. Preferably, the stress at yield of the polypropylene composition is 38 MPa or more, more preferably 40 MPa or more. The upper limit of the stress at yield can be as high as 70 MPa, such as 60 MPa, or 50 MPa.

The thermoplastic composition advantageously exhibits a tensile creep as measured according to ISO 899-1 at 135° C. for 1000 hours and at initial stress of 2 MPa of 3% or less, preferably 2% or less, more preferably 1.5% or less.

The thermoplastic composition advantageously exhibits a tensile creep as measured according to ISO 899-1 at 135° C. for 1000 hours and at initial stress of 3.3 MPa of 5% or less, preferably 4% or less, more preferably 3% or less.

Additionally, the thermoplastic composition advantageously exhibits a heat deflection temperature as measured according to ISO 75 when subjected to 0.45 MPa of at least 120° C., such as at least 125° C. or at least 135° C. The thermoplastic composition advantageously exhibits a heat deflection temperature as measured according to ISO 75 when subjected to 1.8 MPa of at least 75° C., such as at least 80° C. or at least 90° C.

It is preferred that the melt flow index of the thermoplastic composition is at most 0.6 g/10 min as determined in accordance with ISO 1133 (2.16 kg, 230° C.).

Container

The container according to the invention can be a semi-finished or finished article made from the polypropylene composition by a moulding process, such as injection moulding or blow moulding. In an embodiment the container is a tank. In an embodiment the thermoplastic composition may be shaped by means of extrusion so that the container, at least in part, is made by means of extrusion.

For example, the container according to the invention can be an article for air conducting components, cooling water conducting components, oil conducting components, reservoirs and pipes conducting fluids, fuel tanks or oil tanks. More in particular, the container according to the invention can be in the form of, or can be comprised in, a cooling fluid expansion reservoir, a cooling fluid distribution system, a cooling water tank, a thermostat housing, a cooling water pipe, a heat exchanger, or a cooling system connector. In a preferred embodiment, the container of the invention is in the form of a cooling fluid expansion reservoir.

Preferably, the container is in the form of an automotive article, i.e. container that is used for automotive applications. More specifically the container is or is comprised in a cooling fluid expansion reservoir, in particular in automotive applications.

Advantageously, the improved mechanical properties of the thermoplastic composition of the invention allows the preparation of containers (including reservoirs, tanks, pipes, etc.) with relatively small wall thickness. Accordingly, in an embodiment a wall thickness of the container has a thickness of 5 mm or less, preferably in the range of 2-5 mm, such as 2.5-4.5 mm. It was found that such a wall can successfully withstand stringent requirements including temperatures of up to 133° C. and/or pressures of up to 1.6 bar, for up to 3000 hours.

The volume of the container, or in particular the volume of the cooling fluid expansion reservoir is preferably from 0.5 to 10 liters, preferably from 1 to 5 or 1 to 3 liters, the higher volume containers being more typical for trucks, the lower volume containers being more typical for cars.

In a further aspect the present invention relates to a method for the manufacture of a container as described herein comprising blow moulding or injection moulding the thermoplastic composition as defined herein.

In yet a further aspect the present invention relates to the use of a thermoplastic composition as defined herein for the manufacture of a cooling liquid expansion reservoir in automotive applications.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include and intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by the following non-limiting examples.

Test Methods

Charpy Impact

Charpy Impact was measured according to ISO179-1eA and ISO179-1eU at 23° C. Test specimens of 80×10×4 mm were used.

In addition, test specimens were measured at 23° C. after aging in a glycol/water cooling agent. The samples were aged for 42 days at 108° C. in a coolant/water mixture (50:50).

Tensile Modulus and Tensile Strength

Tensile modulus was measured according to ISO 527-2 at 1 mm/min for tensile modulus and 5 mm/min for tensile strength at 23° C. and 80° C. Test specimens of 150×80×4 mm were used. In addition, test specimens were measured at 23° C. after aging in a glycol/water cooling agent. The samples were aged for 42 days at 108° C. in a coolant/water mixture (50:50).

Melt Flow Index

The melt flow index was measured according to ISO 1133:2005 with a load of 2.16 kg and 5 kg at 230° C.

Shrinkage

Mould shrinkage, in the context of this invention called shrinkage, is the amount of contraction that a moulded part undergoes when it is removed from the mould cavity and cooled at room temperature. Shrinkage was measured according to ISO 294-4 on 65×65×3.2 mm injection moulded plaques after a conditioning time of 24 h after moulding at room temperature (23° C.) and 50% relative humidity. Each of the samples was moulded using the same conditions at the moulding machine. Shrinkage measured in the flow length and perpendicular to the flow is reported here. Following equation was used to determine shrinkage:

$$\frac{L_m - L_s}{L_m} \times 100 = \text{shrinkage } [\%]$$

wherein $L_m$ is the length of the mould in the considered direction, and $L_s$ is the length of the specimen in considered direction. A shrinkage in the flow direction, a shrinkage in the perpendicular direction to flow direction, as well as an average (arithmetic) of both shrinkage values is reported.

Heat Deflection Temperature

Heat deflection temperature was measured according to ISO 75, using a flat, 4 mm thick bar, moulded tensile bar subjected to 0.45 MPa or 1.8 MPa. Specimen of dimensions 80×10×4 mm were measured flatwise using injection moulded test specimens.

Tensile Creep

Tensile creep was measured according to ISO 899-1. Tensile creep tests were performed at 135° C. for 1000 hours, and at initial stresses of 2 MPa, 3.3 MPa, and 5 MPa.

EXAMPLES

Polypropylene compositions as defined in tables 2 and 3 were prepared by blending the different ingredients listed in tables 2 and 3 using the ingredients mentioned in Table 1.

As can be seen from Table 3 below, compositions that may be used to prepare a container according to the invention show a good balance of impact and creep.

Legend to the Tables

TC2=ethylene content in random propylene copolymer
Tot. C2=total ethylene content in composition
N/A=not measured.

TABLE 1

| Ingredient | Description | Supplier |
|---|---|---|
| SABIC ® PP 4935 | Polypropylene random copolymer having a $C_2$ monomer content of 1.5 wt. % and a MFI of 0.3 g/10 min (2.16 kg, 230° C.) | SABIC |
| SABIC ® PP 528K | Polypropylene homopolymer having a MFI of 3 g/10 min (2.16 kg, 230° C.) | SABIC |
| SABIC ® PP 651H | Polypropylene random copolymer having a $C_2$ monomer content of 3.3 wt. % and a MFI of 0.25 g/10 min (2.16 kg, 230° C.) | SABIC |
| SABIC ® PP 531 Ph | Polypropylene homopolymer having a MFI of 0.23 g/10 min (2.16 kg, 230° C.) | SABIC |
| glass | Glass fibres, 10 μm diameter average fibre length 4 mm | Binani 3B fibreglass |

TABLE 2

| polypropylene compositions | CE1 | Ex. 1 | Ex. 2 | Ex. 3 |
|---|---|---|---|---|
| SABIC ® PP 4935 | 100 | 93.6 | 88.6 | 83.6 |
| glass | 0 | 5 | 10 | 15 |
| Additives | 0 | 1.4 | 1.4 | 1.4 |
| Total | 100 | 100 | 100 | 100 |
| Charpy Impact Notched 23° C. (kJ/m²) | 25.0 | 18.0 | 17.0 | 18.0 |
| Charpy Impact Notched 23° C. after ageing in glycol/water (kJ/m²) | 85.0 | 24.0 | 17.0 | 14.0 |
| Tensile modulus, 23° C. (MPa) | 1250 | 1740 | 2400 | 3050 |
| Tensile modulus, 80° C. (MPa) | 370 | 625 | 1150 | 1420 |
| Tensile modulus, 23° C. after aging in glycol/water (MPa) | 1175 | 1640 | 2200 | 2790 |
| MFI (dg/min) | 0.3 | 0.24 | 0.21 | 0.14 |
| Shrinkage, average after 24 hours at 23° C. (%) | 1.90 | 1.41 | 1.23 | 1.17 |
| HDT L = 1.8 MPa (° C.) | 56 | 69 | 96 | 107 |
| HDT L = 0.45 MPa (° C.) | 95 | 122 | 140 | 142 |
| Tensile creep at 135° C., 2 MPa (%) | 5.8 | N/A | 1.0 | N/A |
| Tensile creep at 135° C., 3.3 MPa (%) | max elongation (30%) after 4 min | 11.5 | 2.2 | 0.88 |

As can be seen from Table 2, compositions that may be used to prepare a container according to the invention (Examples Ex. 1, Ex. 2 and Ex. 3) show a good balance of impact and creep. Preferably, in the compositions of the invention, the amount of reinforcing fibres is in the range from 8-20 wt % based on the weight of the thermoplastic composition, as a higher amount of reinforcing fibres (Ex. 1 and Ex 2) leads to an increase in stiffness and/or creep resistance, but the impact decreases (compare example 3 (Ex. 3) to example 2 (Ex. 2)) when the amount of reinforcing fibres is higher.

TABLE 3

| polypropylene compositions | Ex. 4 | Ex. 5 | Ex. 6 | Ex. 7 | Ex. 8 |
|---|---|---|---|---|---|
| TC2 (wt %) | 1.5 | 3.3 | 3.3 | 3.3 | 3.3 |
| Tot. C2 (wt %) | 1.5 | 1.5 | 2.2 | 2.2 | 3.3 |
| SABIC ® PP 4935 | 88.6 | 0 | 0 | 0 | 0 |
| SABIC ® PP 528K | 0 | 0 | 30 | 0 | 0 |
| SABIC ® PP 531Ph | 0 | 47.7 | 0 | 30 | 0 |
| SABIC ® PP 651H | 0 | 40.9 | 58.6 | 58.6 | 88.6 |
| glass | 10 | 10 | 10 | 10 | 10 |
| Additives | 1.4 | 1.4 | 1.4 | 1.4 | 1.4 |
| Total | 100 | 100 | 100 | 100 | 100 |
| Charpy Impact Notched 23° C. (kJ/m²) | 17.0 | 17.0 | 17.0 | 18.0 | 20.0 |
| Charpy Impact Notched 23° C. after ageing in glycol/water (kJ/m²) | 17.0 | 18.0 | 20.0 | 18.0 | 25.0 |
| Tensile modulus, 23° C. (MPa) | 2400 | 2550 | 2425 | 2380 | 2000 |
| Tensile modulus, 80° C. (MPa) | 1150 | 1080 | 1100 | 925 | 840 |
| Tensile modulus, 23° C. after aging in glycol/water (MPa) | 2200 | 2520 | 2300 | 2330 | 1890 |
| MFI (dg/min) | 0.21 | 0.16 | 0.26 | 0.15 | 0.13 |
| Shrinkage, average after 24 hours at 23° C. (%) | 1.23 | 1.30 | 1.17 | 1.28 | 1.25 |
| HDT L = 1.8 MPa (° C.) | 96 | 90 | 97 | 86 | 84 |
| HDT L = 0.45 MPa (° C.) | 140 | 140 | 138 | 136 | 127 |
| Tensile creep at 135° C., 2 MPa (%) | 1.0 | N/A | N/A | N/A | N/A |
| Tensile creep at 135° C., 3.3 MPa (%) | 2.2 | 2.0 | 1.7 | 3.0 | N/A |

The invention claimed is:

1. A container prepared from a thermoplastic composition comprising:
from 70-95 wt. % based on the weight of the thermoplastic composition of a polypropylene composition having a total amount of comonomer of at most 3 wt. % based on the weight of the polypropylene composition, wherein the polypropylene composition comprises a random propylene copolymer having a comonomer content from 0.2-5 wt. % based on the weight of the random propylene copolymer and a melt flow index of at most 0.7 g/10 min determined in accordance with ISO 1133 (2.16 kg, 230° C.)

from 5-30 wt. % based on the weight of the thermoplastic composition of reinforcing fibres, from 0-5 wt. % based on the weight of the thermoplastic composition of additives, wherein the thermoplastic composition has a melt flow index of less than 0.3 g/10 min determined in accordance with ISO 1133 (2.16 kg, 230° C.), wherein the container has a shape formed by one or more walk having a wall thickness of thickness of 5 mm or less, wherein the shape is maintained after exposure to a temperature of 133° C. and a pressure of 1.6 bar for 3,000 hours; and wherein the container is a cooling fluid expansion reservoir in automotive applications.

2. The container of claim 1 wherein the polypropylene composition further comprises a propylene homopolymer.

3. The container of claim 2, wherein the propylene homopolymer has a melt flow index of at most 5 g/10 min determined in accordance with ISO 1133 (2.16 kg, 230° C.).

4. The container of claim 1 wherein the amount of random propylene copolymer is from 30-70 wt. % based on the weight of the polypropylene composition.

5. The container of claim 1 wherein the comonomer is selected from the group consisting of ethylene, 1-butene, 1-pentene, 1-hexene, 1-heptene, 1-octene, 1-nonene, 1-decene and 4-methyl-1-pentene.

6. The container of claim 1 wherein the reinforcing fibres are selected from the group of glass fibres, metal fibres, mineral fibres, ceramic fibres, and carbon fibres.

7. The container of claim 6 wherein the reinforcing fibres are glass fibres having a length of from 1-10 mm and a diameter of from 5-30 μm.

8. The container of claim 1 wherein the thermoplastic composition has a tensile modulus as measured in accordance with ISO 527-1A at 23° C. of at least 2000 MPa and/or a stress at yield as measured according to ISO 527 at 23° C. of at least 45 MPa.

9. The container of claim 8 wherein the thermoplastic composition has a tensile modulus as measured in accordance with ISO 527-1A at 23° of at least 2300 MPa and/or a stress at yield as measured according to ISO 527 at 23° C. of at least 50 MPa.

10. The container of claim 1 wherein the thermoplastic composition has a heat deflection temperature (HDT) as measured in accordance with ISO 75 at a load of 0.45 MPa of at least 135° C. and/or a HDT as measured in accordance with ISO 75 at a load of 1.8 MPa of at least 90° C.

11. The container of claim 1 wherein the additives comprise an adhesion promoter for promoting the adhesion between the reinforcing fibres and the polypropylene composition.

12. The container of claim 11 wherein the adhesion promoter is a modified polyolefin comprising any one or more of acid anhydride groups or carboxylic acid groups.

13. The container of claim 1 wherein the comonomer is ethylene.

14. The container of claim 1 herein the random propylene copolymer has a melt flow index of 0.15-0.25 g/10 min.

15. A method for the manufacture of the container of claim 1 comprising blow moulding or injection moulding the thermoplastic composition to form the container.

16. A container prepared from a thermoplastic composition comprising from 70-95 wt. % based on the weight of the thermoplastic composition of a polypropylene composition having a total amount of comonomer of at most 3 wt. % based on the weight of the polypropylene composition, wherein the polypropylene composition comprises a random propylene copolymer having an ethylene content from 0.2-5 wt. % based on the weight of the random propylene copolymer and a melt flow index of at most 0.7 g/10 min determined in accordance with ISO 1133 (2.16 kg, 230° C.), from 5-15 wt. % based on the weight of the thermoplastic composition of glass fibres having a length of from 1-10 mm and a diameter of from 5-30 μm, from 0-3 wt. % based on the weight of the thermoplastic composition of additives wherein the thermoplastic composition has a melt flow index of less than 0.3 g/10 min determined in accordance with ISO 1133 (2.16 kg, 230° C.);

wherein the container is a cooling fluid expansion reservoir in automotive applications.

17. An internal combustion engine, comprising:

a cooling fluid expansion reservoir, wherein the cooling fluid expansion reservoir is prepared from a thermoplastic composition comprising from 70-95 wt. % based on the weight of the thermoplastic composition of a polypropylene composition having a total amount of comonomer of at most 3 wt. % based on the weight of the polypropylene composition, wherein the polypropylene composition comprises a random propylene copolymer having a comonomer content from 0.2-5 wt. % based on the weight of the random propylene copolymer and a melt flow index of at most 0.7 g/10 min determined in accordance with ISO 1133 (2.16 kg, 230° C.), from 5-30 wt. % based on the weight of the thermoplastic composition of reinforcing fibres, from 0-5 wt. % based on the weight of the thermoplastic composition of additives, wherein the thermoplastic composition has a melt flow index of less than 0.3 g/10 min determined in accordance with ISO 1133 (2.16 kg, 230° C.).

* * * * *